April 14, 1925.  
P. J. DOLLAR  
1,533,496  
HEADLIGHT  
Filed June 16, 1924   2 Sheets-Sheet 1
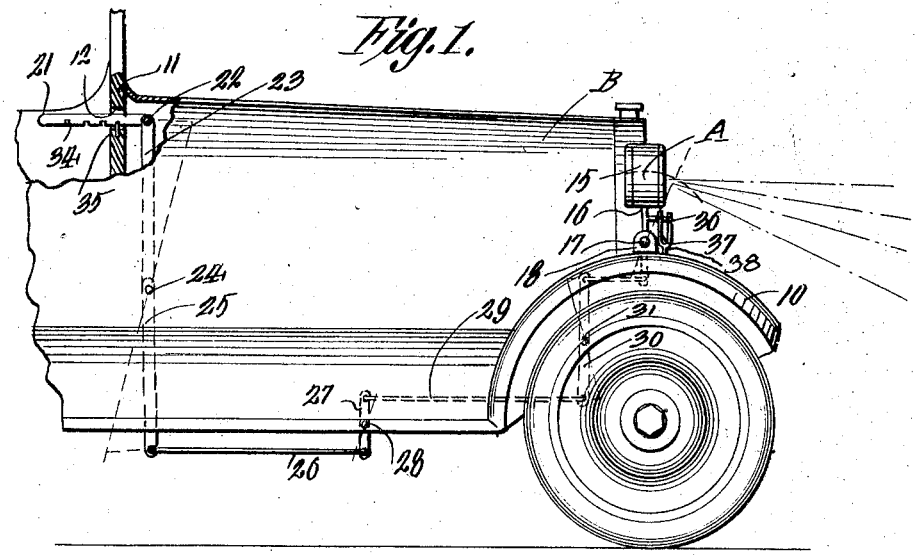
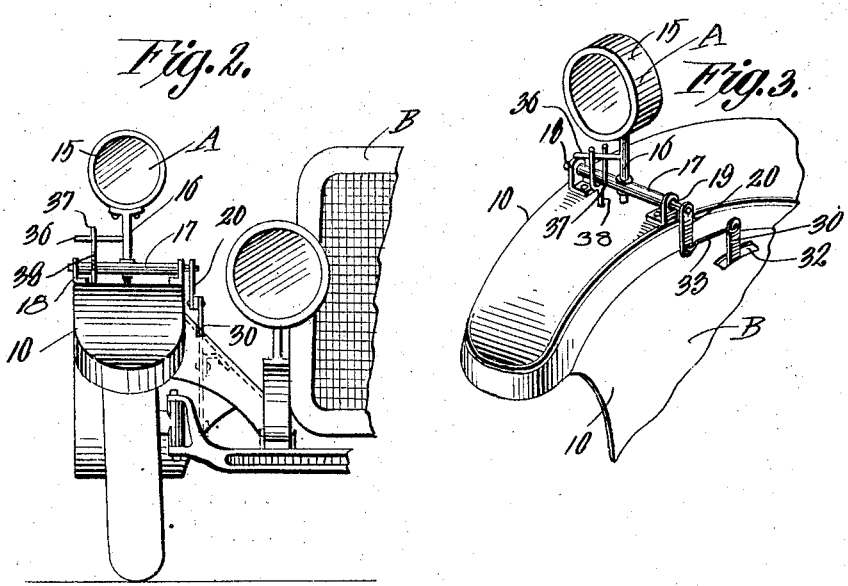
WITNESSES
Inventor  
PETER J. DOLLAR
Attorney

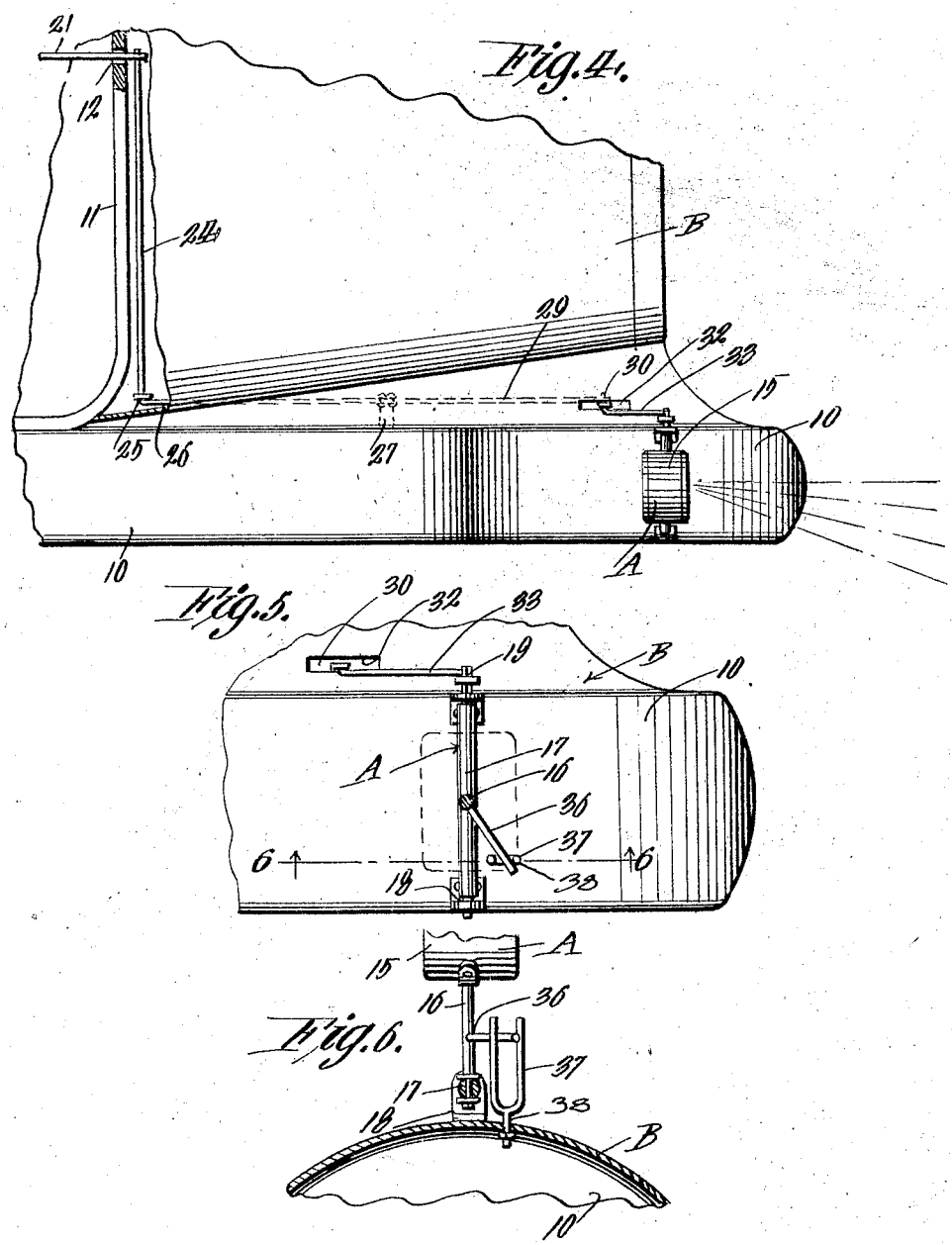

Patented Apr. 14, 1925.

1,533,496

UNITED STATES PATENT OFFICE.

PETER JOSEPH DOLLAR, OF GREEN BAY, WISCONSIN.

HEADLIGHT.

Application filed June 16, 1924. Serial No. 720,443.

*To all whom it may concern:*

Be it known that I, PETER JOSEPH DOLLAR, a citizen of the United States, residing at Green Bay, in the county of Brown and State of Wisconsin, have invented certain new and useful Improvements in Headlights, of which the following is a specification.

This invention appertains to motor vehicle attachments and the primary object of the invention is to provide a novel headlight for automobiles which can be readily actuated so as to permit the rays cast therefrom to be directed downward and to one side of the road, thereby facilitating the safe passing of vehicles on the road at nighttime.

Another object of the invention is the provision of a dirigible headlight arranged on the right-hand side of a vehicle and novel means disposed adjacent to the driver's seat for permitting the manipulation of the headlights so that the same can be tilted downward and to the right when so desired, the headlight forming an effective means for illuminating the side of the road and thus allowing the driver to readily see whether there are any obstructions on the road-side.

A further object of the invention is the provision of a headlight carried by a lamp standard which is rotatably mounted on a horizontal pivot, the pivot being operatively connected with means disposed in the driver's cab so that the same can be rotated when desired to permit the rays of light from the headlight to be cast on the roadway, the lamp standard having an operating arm formed thereon and arranged in the path of a stop member of the vehicle, whereby when the headlight is tilted downward, the same will be synchronously turned at an angle to the travel of the vehicle, thereby permitting the rays of light to be cast to one side as well as downward on the roadway.

A still further object of the invention is to provide a dirigible headlight of the above character, which will be durable and efficient in use, one that will be simple and easy to manufacture, and one which can be incorporated with a vehicle at a small cost.

With these and other objects in view, the invention consists in the novel construction, arrangement, and formation of parts, as will be hereinafter more specifically described, claimed, and illustrated in the accompanying drawings, in which drawings:

Figure 1 is a fragmentary side elevation of a motor vehicle showing the improved device incorporated therewith, a part of the vehicle being shown in section and broken away, Figure 2 is a fragmentary side elevation of an automobile showing the improved device incorporated therewith, Figure 3 is a fragmentary perspective view of a front right-hand fender of an automobile showing the means of associating the headlight therewith, Figure 4 is a fragmentary top plan view of an automobile with the improved device incorporated therewith, Figure 5 is an enlarged fragmentary plan view of a front right-hand automobile fender illustrating the vertical and horizontal pivot for the headlight, the vertical pivot or lamp standard being shown in section, and Figure 6 is a vertical section taken on the line 6—6 of Figure 5 illustrating the stop for synchronously turning the headlight to an angle to the path of travel during the rocking of the lamp on its horizontal pivot.

Referring to the drawings in detail, wherein similar reference characters designate corresponding parts throughout the several views, the letter A generally indicates the improved apparatus, and B a motor vehicle with which the same can be incorporated.

The vehicle B has been illustrated only to show the use of the device and can be of any preferred character or type, and as shown includes a right-hand fender 10 and a dashboard 11. The dashboard 11 adjacent to the driver's seat is provided with an opening 12 for a purpose, which will be hereinafter more fully described.

The improved attachment A embodies a headlight 15 of any standard make to which is secured in any desired way a vertically disposed lamp standard 16. The lower end of the lamp standard 16 is rotatably mounted in a shaft 17 which extends transversely across the fender 10. The fender 10 has riveted or otherwise secured thereto spaced bearing brackets 18 in which the shaft 17 is rotatably mounted. It can be seen by this construction that the headlight 15 is mounted both on a vertical and a horizontal pivot. The inner end of the shaft is provided with a polygonal extension 19 to which is secured a crank arm 20. In order to bring about the rotation of the shaft 17 so that the headlight 15 can be tilted downward and to the side a hand lever 21 is provided which extends through the opening 12 in the dashboard 11 into the body of the automobile adjacent to the driver's seat. The inner end of this lever is connected by means of a pivot pin 22 with a lever 23 which is in turn secured to a transversely extending rock shaft 24 mounted in any preferred way on the vehicle. The shaft 24 in turn carries a depending operating arm 25 the lower end of which is connected by means of a link 26 with a double armed lever 27. This lever is rockably mounted at a point intermediate its ends on a suitable pin or the like 28 carried by the vehicle. The upper arm of the lever 27 is in turn connected by means of a link 29 with the lower end of a double lever 30. This lever 30 in turn is rockably mounted at a point equi-distant its ends on a pivot 31 which is carried or supported by the vehicle. The upper end of the lever 30 is protruded through a slot formed in the fender 10 as at 32 and has pivotally connected thereto a link 33. This link 33 is pivotally connected to the crank arm 20.

Now it is merely necessary to push the hand lever 21 in and out when it is desired to rock the headlight 15 on a vertical pivot. In order to hold the hand lever 21 and consequently the headlight 15 in an adjusted position the lower end of the hand lever 21 is provided with notches 34 anyone of which is adapted to receive a holding plate 35 rigidly connected to the lower wall of the opening 12.

In order to move the headlight 15 on its vertical pivot during the rocking thereof by the turning of the shaft 17 a radially extending arm 36 is formed on or rigidly connected with the lamp standard 16. This arm 36 is received between the parallel arms 37 of a yoke 38 which is rigidly attached to the fender 10. When the shaft 17 is rocked and the headlight 15 moves forwardly and downwardly it can be seen that the arm 36 will engage one arm of the yoke 38 thereby turning the standard 16 which of course will cast the rays of light toward the right side of the road thereby effectively illuminating that portion of the road.

Changes in details may be made without departing from the spirit or the scope of this invention, but:

What I claim as new is:

1. The combination with an automobile including a right-hand fender, of an attachment therefor including a headlight, a horizontally disposed shaft extending transversely across the fender and rotatably mounted thereon, a standard rigidly secured to the headlight and rotatably mounted on the shaft, an operating hand lever, means for operatively connecting the hand lever with the shaft for bringing about the rotation thereof upon actuation of the hand lever, a U-shaped yoke rigidly secured to the fender, and a radially extending arm secured to the standard disposed between the arms of the U-shaped yoke.

2. The combination with an automobile including a fender and a dashboard having an opening therein, the lower wall of the opening being provided with a rigid holding plate, of an attachment for the vehicle including a transversely extending shaft arranged on the fender in a horizontal plane, bearing brackets rigidly secured to the fender rotatably receiving the terminals of the shaft, a crank arm rigidly secured to the shaft, a lamp standard rotatably carried by the shaft, a headlight rigidly secured to the standard, a U-shaped yoke rigidly secured to the fender at one side of the lamp standard, and a radially extending arm rigidly connected with the lamp standard and received in said yoke, an actuating lever extending through the opening in the dashboard having a plurality of notches therein for receiving the stop plate whereby the lever can be held in an adjusted position, and means for operatively connecting the hand lever with the crank arm.

3. The combination with an automobile of a dirigible headlight including a horizontal shaft rockably supported by the automobile, a single lamp standard extending from the shaft at right angles thereto and rotatably carried thereby, means for rocking the shaft for swinging the headlights in a vertical plane, a rigid arm carried by the standard and extending radially therefrom beyond the shaft, and a pair of arms rigidly carried by the automobile receiving the arm therebetween for swinging the headlight in a horizontal plane during movement of the headlight in a vertical plane.

In testimony whereof I affix my signature in presence of two witnesses.

PETER JOSEPH DOLLAR.

Witnesses:
   REYMOND E. EVRARD,
   ESTHER NITZ.